United States Patent [19]

Legner

[11] Patent Number: 5,700,220
[45] Date of Patent: Dec. 23, 1997

[54] POWER-SHIFTABLE GEAR, ESPECIALLY TWO-SPEED PLANET GEAR

[75] Inventor: Jürgen Legner, Friedrichshafen, Germany

[73] Assignee: ZF Friedrichshafen AG, Friedrichshafen, Germany

[21] Appl. No.: 687,356

[22] PCT Filed: Feb. 14, 1995

[86] PCT No.: PCT/EP95/00531

§ 371 Date: Aug. 1, 1996

§ 102(e) Date: Aug. 1, 1996

[87] PCT Pub. No.: WO95/22705

PCT Pub. Date: Aug. 24, 1995

[30] Foreign Application Priority Data

Feb. 19, 1994 [DE] Germany .................. 44 05 299.5

[51] Int. Cl.$^6$ .................................................. F16H 61/06
[52] U.S. Cl. ...................................... 475/129; 475/140
[58] Field of Search ............................. 475/129, 140

[56] References Cited

U.S. PATENT DOCUMENTS 5,098,354  3/1992  Kuwayama et al. .............. 475/129

FOREIGN PATENT DOCUMENTS

| 0314183 | 5/1989 | European Pat. Off. |
| 8908796 | 9/1989 | WIPO |
| 9407060 | 3/1994 | WIPO |

OTHER PUBLICATIONS

AN 89–208046 & DE A 3844126 (Akebono) Derwent Publ.

*Primary Examiner*—Dirk Wright
*Attorney, Agent, or Firm*—Davis and Bujold

[57] ABSTRACT

The invention relates to a power-shiftable two-speed gear. The gear is designed as planet gear (3). The two ratios can be hydraulically shifted via two friction clutches (9 and 10). At least one of the friction clutches (9 or 10) is fitted with a mechanism which prevents the full locking pressure from acting upon the friction components during downshifts or upshifts. A store (30), which the torque curve can be affected, is used for this purpose. To prevent traction loss and abrupt changes which are found to be particularly unpleasant, the store (30) consists of a cylinder (32) and a piston (33) is fitted in the line (18 and 24) leading to the pressure chamber (17 and 23). A non-return valve (28) with a choke (29) in parallel with it is integrated into the piston.

6 Claims, 3 Drawing Sheets

POWER-SHIFTABLE GEAR, ESPECIALLY TWO-SPEED PLANET GEAR

The invention concerns a power-shiftable gear, especially a two-speed gear preferably designed as planet gear. The ratios of said gear are shifted by hydraulically actuatable friction clutches. The friction components (inner and outer discs) of the friction clutches are engaged by spring tension and disengaged by oil pressure.

In a power-shiftable gear disclosed in WO 89/08796, two speeds can be shifted. When shifting the speeds, friction clutches (one of said friction clutches acts as brake) are alternatively disengaged and engaged. The friction clutches are engaged by plate springs. When both friction clutches are pressureless, that is, engaged, the input and output (parking brake) are blocked.

Due to the relatively strong forces of the plate spring, the pressure medium (hydraulic oil) is removed from the respective pressure chambers to the tank within a very short time. The time needed for disengaging the friction clutches depends on the delivery rate of a source of pressure medium (pump).

By inserting non-return valves with chokes in parallel therewith in the line leading to the pressure chambers, it can be ensured that the alternative disengaging and engaging of the friction clutches be adjusted in a manner such that the friction clutch to be engaged is engaged only when the friction clutch to be disengaged is disengaged.

The non-return valves, added around the chokes, are disposed so that upon opening the oil current can flow unchecked into the respective pressure chamber. When closing, the oil current removed from the pressure chamber is choked drawn into the tank.

The moment of closing can be affected by the valves mentioned. The engaging operation itself, that is, the timed torque intake of the friction clutch, cannot be affected thereby. As soon as the piston working upon the friction components in the sense of engaging has overcome the clearance (sum of the spacings of the inner and outer discs of a friction clutch in a disengaged state), the torque transmissible by the friction components suddenly increases to a maximum valve. Since the engaging operation takes place in a very short time, this makes an abrupt change itself noticeable, especially during a downshift from the second to the first speed, which is felt as especially unpleasant.

An older not previously published proposal of the applicant (international patent application PCT/EP93/02421)-which is the point of departure of the instant invention-relates to means which prevent, during a gear change, that the full locking force acts first upon the friction components of the friction clutches. Thus, the torque curve can, in particular, be affected so as to avoid an abrupt change.

This invention is based on the problem of further improving the pressure and torque curves when downshifting or upshifting.

The stated problem is solved by a power-shiftable gear, especially a two-speed gear designed as planet gear, having at least one friction clutch the friction components of which are engaged by spring tension and disengaged by oil pressure, one line leading to a pressure chamber and in which is a store formed by one cylinder and one spring-loaded piston with a non-return valve and a choke in parallel with it.

Hereby is prevented, in the first place, that when clearance between the friction components is reduced to a value of zero or near zero, the full spring tension act upon the friction components. In addition, the store is situated in the line leading to the pressure chamber of the friction clutch in a manner such that during engaging the friction clutch the phase lasting until the torque begins to be taken over is shortened. Loss of traction practically does not occur.

In a preferred embodiment, when the friction clutch is disengaged, the piston assumes a position in which the store has a minimum of storage capacity.

Since the store is practically empty when the friction clutch is disengaged, it is very advantageously possible during the beginning of engaging of the friction clutch, that is, with the line connected with the tank and engaged non-return valve, immediately to convey a part of the pressure medium that is in the pressure chamber into the store. The store then has a maximum storage capacity.

A steady torque curve results when the residual pressure medium remaining, in the pressure chamber flows off, via the choke, during the further course of the engaging movement of the friction clutch.

It is especially advantageous if the ratio of capacity of the pressure chamber when the friction clutch is disengaged to the maximum store capacity is chosen to be substantially 2:1. By selecting an adequate ratio of both capacities it is easily possible to vary the time that elapses until beginning of assumption of the torque.

Other features essential to the invention and the advantages resulting therefrom are to be understood from the description that follows of an embodiment. In the drawings:

FIG. 1 diagrammatically shows a cross section through a power-shiftable gear and the elements required for shifting the gear;

Figure 1:
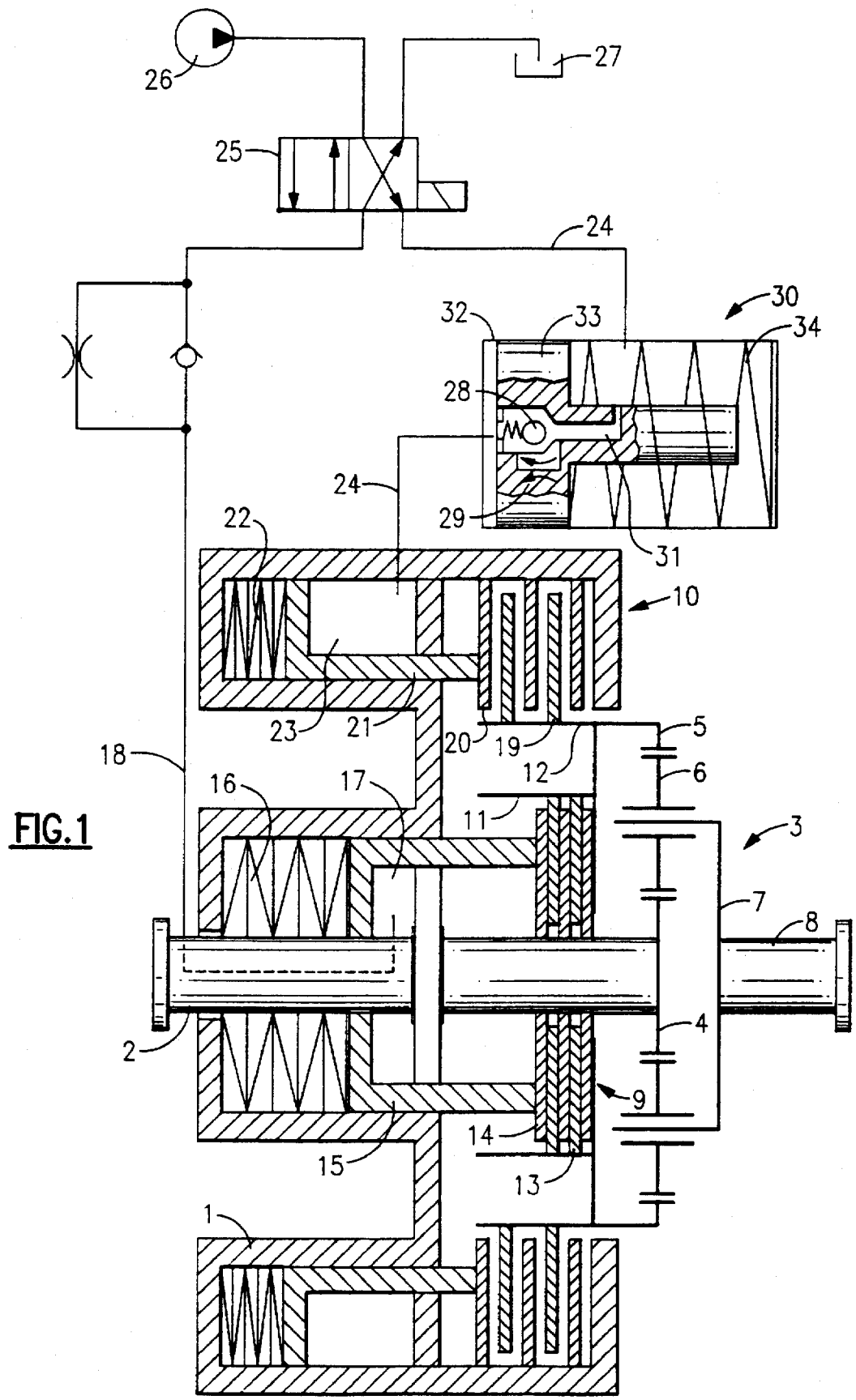

The gear diagrammatically shown in cross section in FIG. 1 is a hydraulically power-shiftable two-speed gear. An input shaft 2 is rotatably situated in a housing 1. The input shaft 2 is driven by a prime mover, itself not shown. This can be, for example, a continuously adjustable hydraulic motor or an electromotor. The hydraulically power-shiftable gear is preferably designed as planet gear 3. The planet gear 3 is specifically comprised of one inner central gear 4, one outer central gear 5, several planet gears 6 and a planet carrier 7. The planet gears 6 are rotatably supported on the planet carrier 7, while the latter is non-rotatably connected with an output shaft 8. The output shaft 8 can be in driving connection with a spur gear stage, itself not shown, by which an output shaft is actuated for moving the gears of a loader or the like.

Both ratios of the power-shiftable gear are hydraulically shiftable via two friction clutches 9 and 10. The outer friction clutch 10 is here preferably situated concentrically in relation to the inner friction clutch 9 and designed as brake. Regardless of its function as a brake, this part is designated as a friction clutch.

The outer central gear 5 has two disc carriers 11 and 12. Said disc carriers 11 and 12, together with the outer central gear 5, are preferably made as a one-piece component.

This disc carrier 11 lying internally in the drawing, non-rotatably and axially movably accommodates, in a manner known per se, outer discs 13 of the friction clutch 9. Inner discs 14 belonging thereto are situated on the input shaft 2 non-rotatably and axially movably, as known per se.

A pot-shaped piston 15 is axially movably passed into the housing 1. Said piston is actuated by several plate springs 16 so as to be displaced in a closing direction toward the outer and inner discs 13 and 14 of the friction clutch 9. Within the interior of the piston 15 is a pressure chamber 17 to which leads a first line 18 through which pressure medium, such as oil, is supplied and removed.

From what has already been said, it follows that when the pressure chamber 17 is pressureless, the friction clutch 9 is engaged by the tension of the plate springs 16 which loads the piston 15 and moves it to the right-based on the drawing. If, on the contrary, the pressure chamber 17 is pressurized with a pressure medium, the friction clutch 9 is disengaged against the tension of the plate springs 16, that is, the piston 15 moves to the left-based on the drawing.

The friction components of the friction clutch 10 consist of inner discs 19 which are retained upon the disc carrier 12 of the outer central gear 5 and outer discs 20 situated in the housing 1, in a manner known per se. For disengaging and engaging the friction clutch 10, another piston 21 is provided which is sliding passed axially into the housing 1 and upon which acts a tension exerted by plate springs 22. A line 24 leads from a store 30 to a pressure chamber 23.

As can be seen from the drawings, the friction clutch 9 is in an engaged state while the friction clutch 10 is disengaged. The second speed is engaged. The torque of the input shaft, on one hand, is passed via the engaged friction clutch 9 and the outer central gear 5 to the planet gears 6 and, on the other hand, via the inner central gear 4 to the planet gears 6. The planet carrier 7 then transmits the added up power to the output shaft 8.

The lines 18 and 24 are connectable either with a pump 26 or with a tank 27 via a gear-change valve 25 designed as 4/2 directional valve. As shown in the drawing, between the gear-change valve 25 and the pressure chamber 17, in the line 18, can be inserted a non-return valve with a choke in parallel therewith. The non-return valve allows an unhindered pressurization of the pressure chamber 17 with pressure oil, while the return of the oil current from the pressure chamber 17 to the tank 27 is choked.

The line 24 differs from the above explained design. A first part of said line is attached to the store 30.

The store 30 basically consists of one cylinder 32 into which a piston 33 is axially movably passed.

The piston 33 is spring loaded, for example, by a compression spring 34. The piston 33 divides the store 30 in two compartments. The first part of the line 24 discharges in the first compartment appearing to the right in the drawing (in which is housed the compression spring). A second part of the line 24 leads from the second compartment, appearing to the right, in the drawing to the pressure chamber 23 of the friction clutch 10.

The first and the second parts of the line 24 are interconnected by a duct 31. The duct 31 can be formed, for example, by holes which penetrate the piston 33. The duct 31 can be understood as a component part of the line 24.

In the piston, specifically within the duct 31, is integrated a non-return valve 28 with a choke 29 in parallel with it. When the friction clutch is disengaged (see FIG. 1), the pressure medium flows from the pump 26 via the gear-change valve 25 to the store 30 and when the non-return valve 28 is open, it flows through the duct 31 to the pressure chamber 23. The piston 33 assumes its left end position shown in the drawing. In this position, practically no pressure medium accumulates in the store 30. The friction clutch 10 is disengaged: the second speed is engaged.

Figure 2:
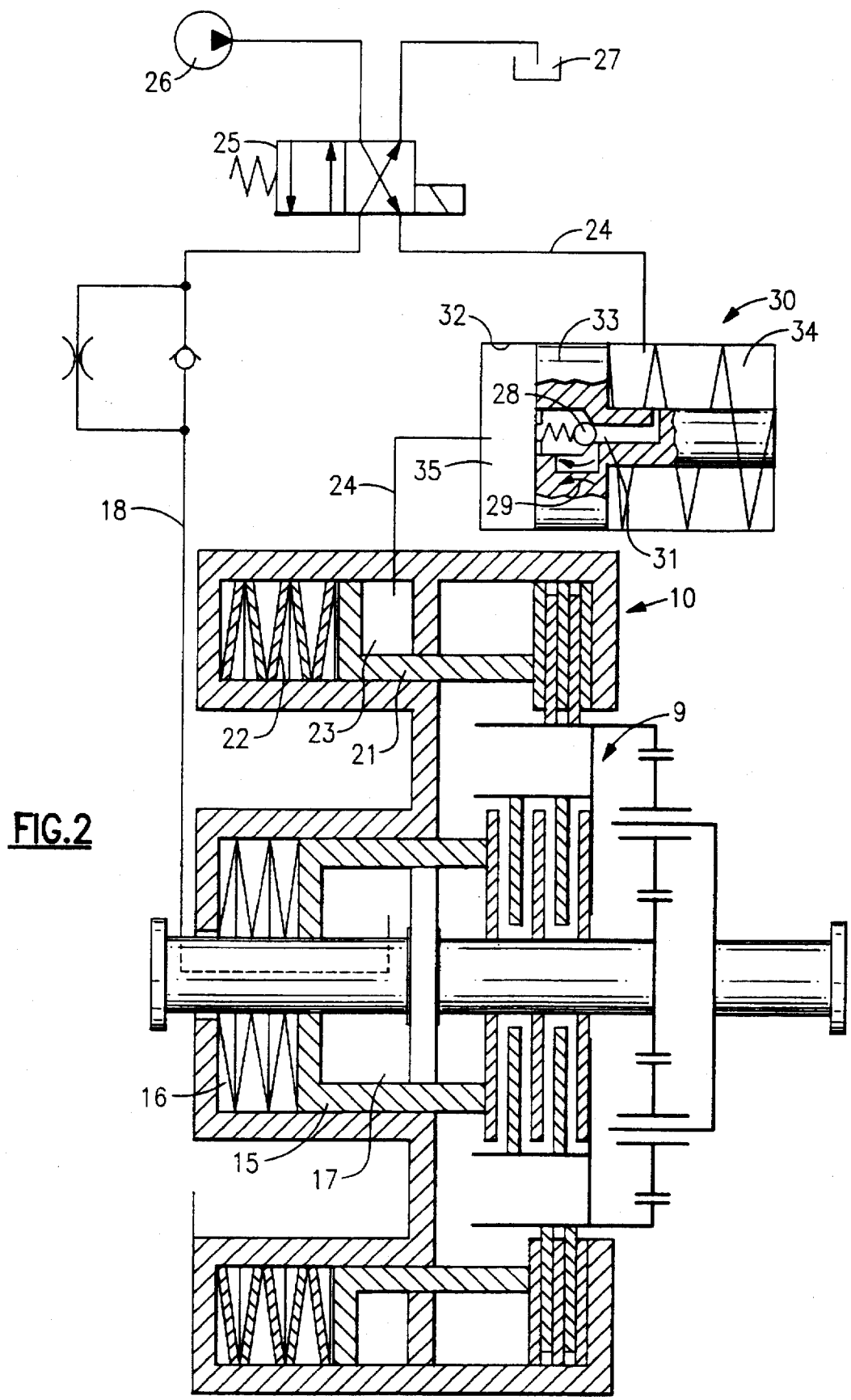
FIG. 2 is the power-shiftable gear of FIG. 1 in a different shift position.

When downshifting from the second to the first speed, the gear-change valve 25 changes its shift position and assumes the shift position shown in FIG. 2. The line 18 is connected with the pump 26. When downshifting, the pressure chamber 17 is filled with pressure medium. The piston 15 moves to the left against the tension of the plate springs 16. The friction clutch 9 is disengaged.

With the change of the gear-shift position of the gear-change valve 25, a partial volume of the pressure medium engaged in the pressure chamber 23 of the friction clutch 10 is transferred immediately to the cylinder space-lying to the left of the store 30. The store capacity 35 reaches a maximum practically without delay. The volume of the pressure medium still remaining in the pressure chamber amounts substantially to one half of the output volume or, expressed in other words, the store immediately takes over one half of the output volume. The friction components (inner and outer discs 19 and 20) of the friction clutch 10 move here toward each other until the release clearance finally assumes a zero value. This shifting state is shown in FIG. 2.

In order to prevent the friction clutch 10 from suddenly transmitting the full torque when the release clearance of the friction components is reduced to the value of zero, the pressure medium enclosed in the store 30 (store capacity 35) now flows out (the non-return valve 28 is engaged) via the choke 29 and the line 24 to the tank 27. The time curve can be affected by the characteristic line of the compression spring 34 and the design of the choke 29. The store 30 takes over a retaining function in a manner such that a retaining pressure remains in the line 24 between the pressure chamber 23 and the non-return valve 28. Said retaining pressure is reduced not suddenly but steadily by the removal of the pressure oil enclosed in the store 30 via the choke 29. Due to the steady reduction of said retaining pressure, the friction clutch 10 becomes finally completely engaged with a steady transition. In said transitional phase (slip phase of the friction components of the friction clutch 10), the piston 33 moves to the left under the tension of the compression spring 34 until the store capacity 35 has reached a minimum value. The plate springs 22 convert the piston 21 to its final engaged position.

Figure 3:
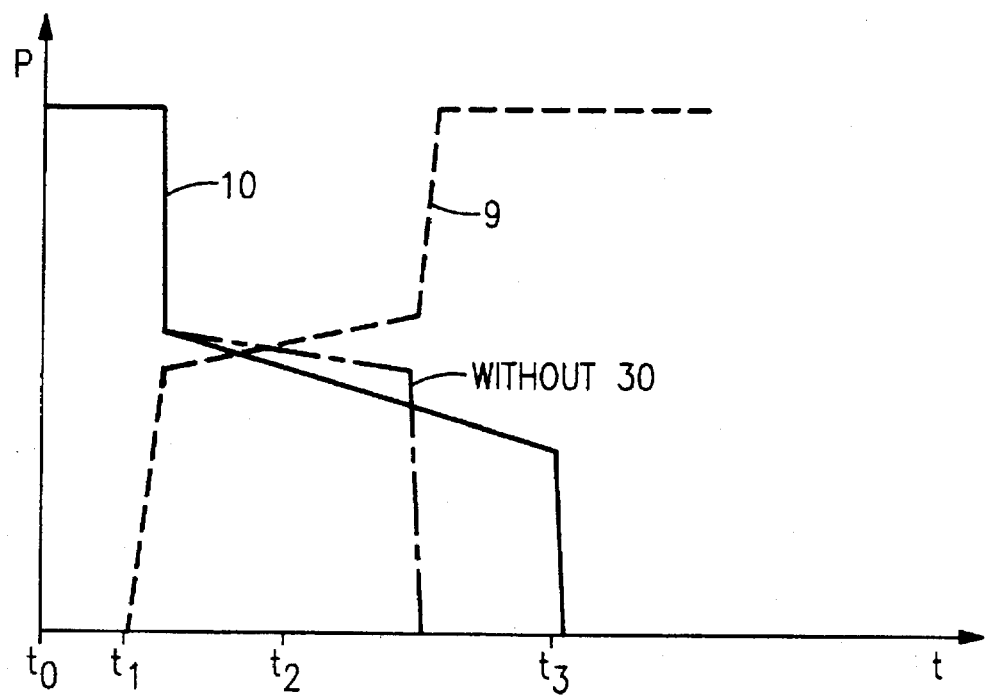
FIG. 3 is a diagram reproducing the pressure curve over the course of time for a downshift/upshift.

The pressure curves over the course of time are to be understood from the diagram of FIG. 3. At the moment t1, the downshift is started. The gear-change valve 25 is reversed. The drawn lines apply to the pressure curve in the pressure chamber 23. From the moment t1 to the moment t2, the store capacity 35 is built up. The phase of a traction loss (period of time t1 to t2) is accordingly extremely short. During the period of time from t2 to t3, the friction clutch 10 is engaged by a steady reduction of pressure so that the gear-shift operation proceeds smoothly. Starting from the moment t3, the pressure in the pressure chamber 23 drops quickly to zero.

Figure 4:
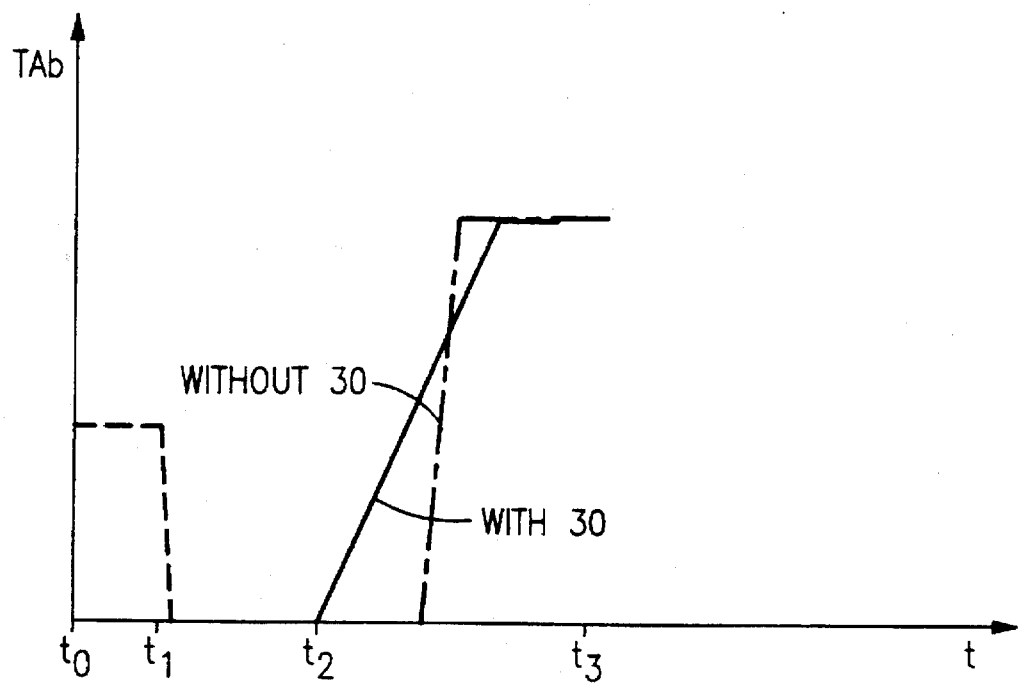
FIG. 4 is a diagram showing the torque curve for a downshift/upshift.

The torque curve of the downshift is to be understood from the diagram in FIG. 4. The engaging friction clutch 10 starts absorbing the torque at the moment t2. Without the store, the torque increase-at a later moment, that is, with a longer phase of a traction loss-would proceed very abruptly, as shown by the dotted line.

The engaging process can be affected in several respects. A timed change is possible by varying cross section of the choke 29. The engaging process can be affected by the design of the characteristic line of the compression spring 34 (the use of a different adequate spring is obviously possible) and by the store capacity 35.

The invention can also be applied to rotary friction clutches.

Finally let it be pointed out that the arrangement according to the invention, can equally be used both in downshift and upshift processes.

| Reference numerals | |
|---|---|
| 1 housing | 19 inner discs |
| 2 input shaft | 20 outer discs |
| 3 planetary gear | 21 piston |
| 4 inner central gear | 22 plate spring |
| 5 outer central gear | 23 pressure chamber |
| 6 planetary gear | 24 line |
| 7 planetary gear carrier | 25 gear-change valve |
| 8 output shaft | 26 pump |
| 9 friction clutch | 27 tank |
| 10 friction clutch | 28 non-return valve |
| 11 disc carrier | 29 choke |
| 12 disc carrier | 30 store |
| 13 outer discs | 31 duct |
| 14 inner discs | 32 cylinder |
| 15 piston | 33 piston |
| 16 plate spring | 34 compression spring |
| 17 pressure chamber | 35 store capacity |
| 18 line | |

I claim:

1. A power-shiftable gear, especially two-speed gear designed as planet gear (3), having at least one friction clutch (9 and 10) the friction components of which (13, 14 and 19, 20) are engaged by spring tension (16, 22) and disengaged by oil pressure, having a line (18 and 24) which leads to a pressure chamber (17 and 23) and in which is a store (30) comprising of one cylinder (32) and one spring-loaded piston (33) with a non-return valve (28) and a choke (29) in parallel with it.

2. A gear according to claim 1, characterized in that said piston (33), when said friction clutch (9 and 10) is engaged, assumes a position in which the store has a minimum storage capacity (35).

3. A gear according to claim 1, characterized in that in said store (30), at the beginning of engaging said friction clutch (9 and 10) when said line (18 and 24) is connected with said tank (17) and said non-return valve (28) is engaged, part of the pressure medium is transmitted into said pressure chamber (17 and 23), said store (30) has a maximum storage capacity (35).

4. A gear according to claim 3, characterized in that the residual pressure medium remaining in said pressure chamber (17 and 23) discharges via said choke (29) during the further course of the closing movement of said friction clutch (9 and 10).

5. A gear according to claim 3, characterized in that a ratio of the capacity of said pressure chamber (17 and 23), when said friction clutch (9 and 10) is disengaged, to the maximum store capacity (35) is about 2:1.

6. A gear according to claim 4, characterized in that a ratio of the capacity of said pressure chamber (17 and 23), when said friction clutch (9 and 10) is disengaged, to the maximum store capacity (35) is about 2:1.

* * * * *